Sept. 3, 1963   B. N. WILLIS   3,102,566
BLADE CONTROL MECHANISM FOR CITRUS FRUIT SECTIONIZING MACHINES
Filed Dec. 23, 1960   4 Sheets-Sheet 1
FIG_1
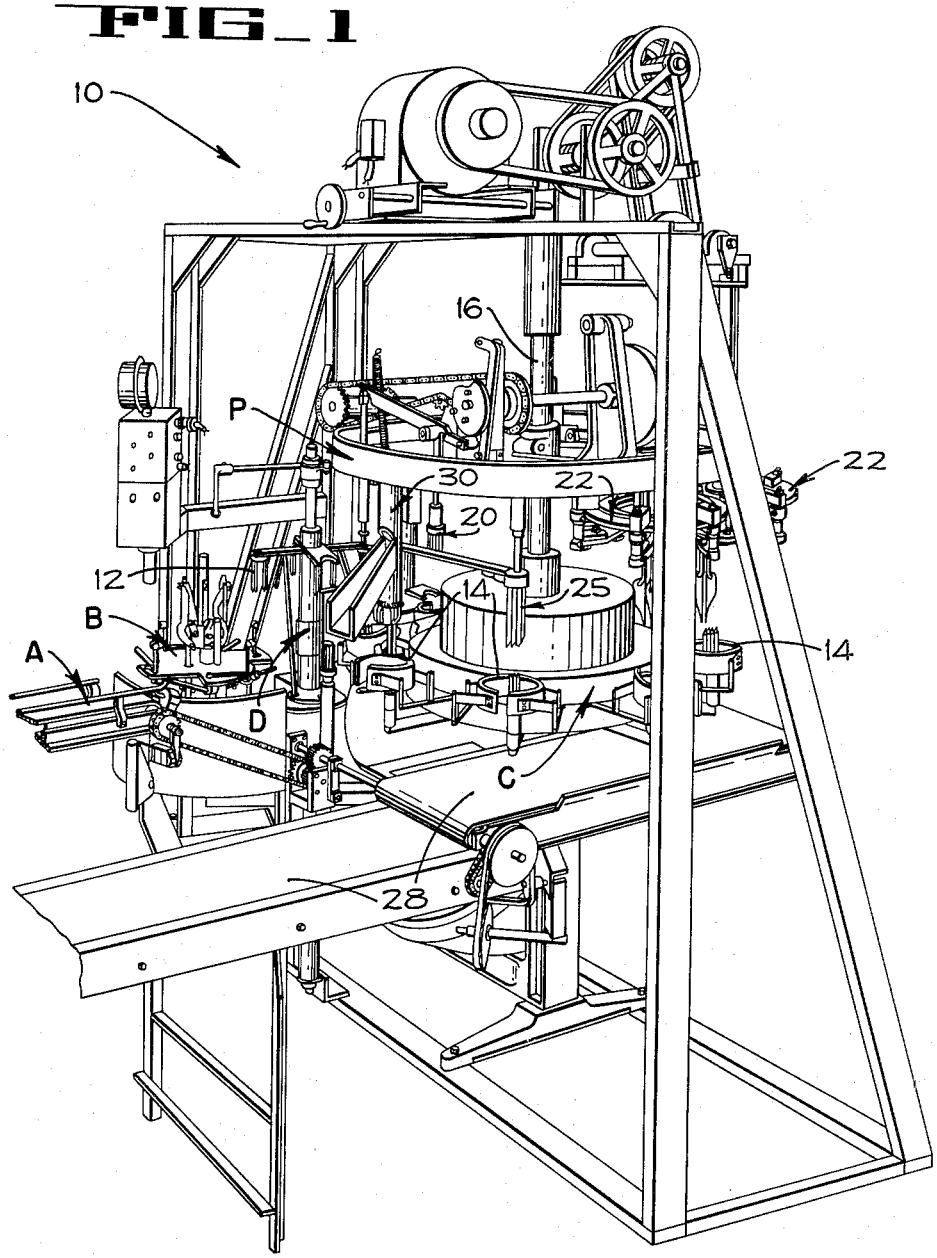
INVENTOR
BEUFORD N. WILLIS
BY *Hans G. Hoffmeister*
ATTORNEY

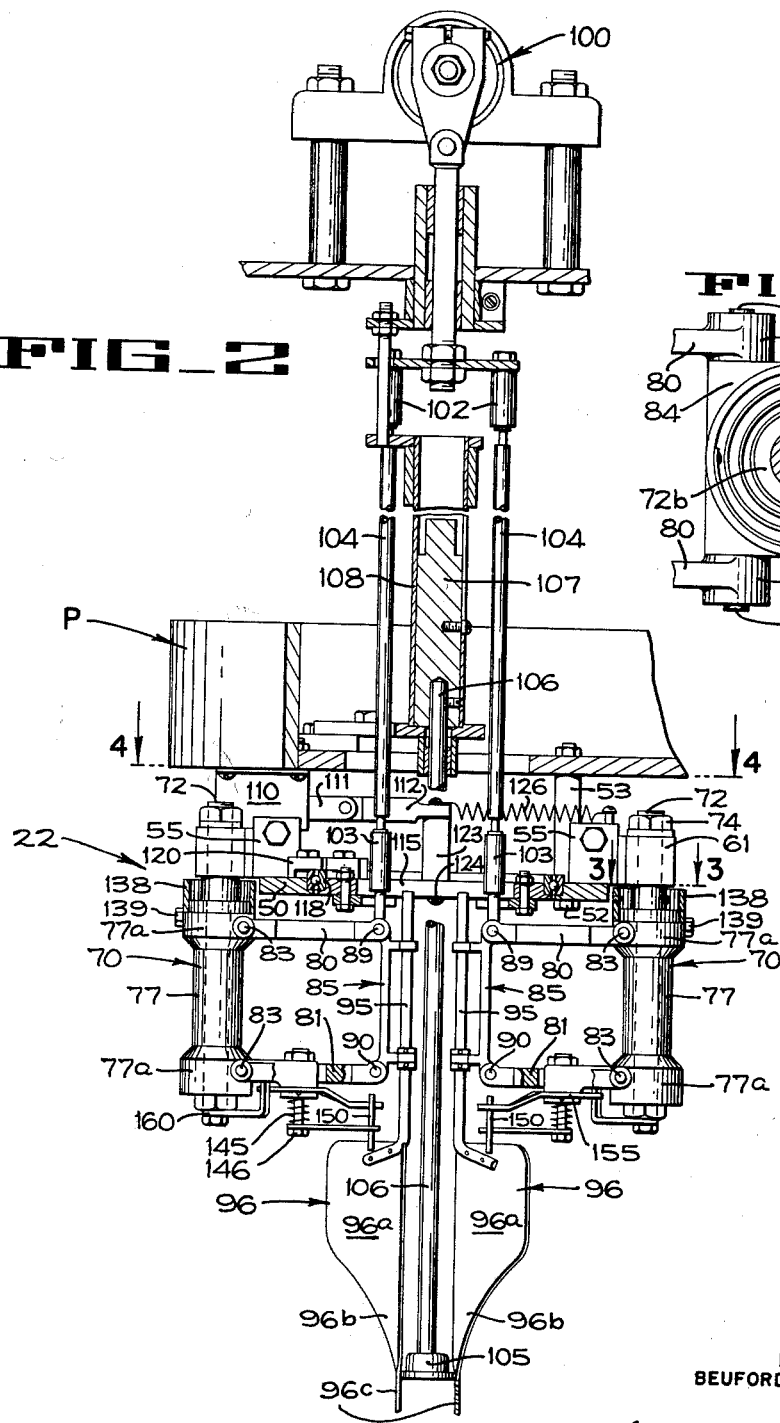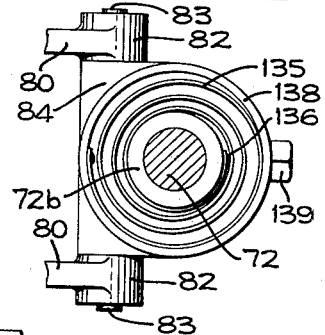

Sept. 3, 1963  B. N. WILLIS  3,102,566
BLADE CONTROL MECHANISM FOR CITRUS FRUIT SECTIONIZING MACHINES
Filed Dec. 23, 1960  4 Sheets-Sheet 3
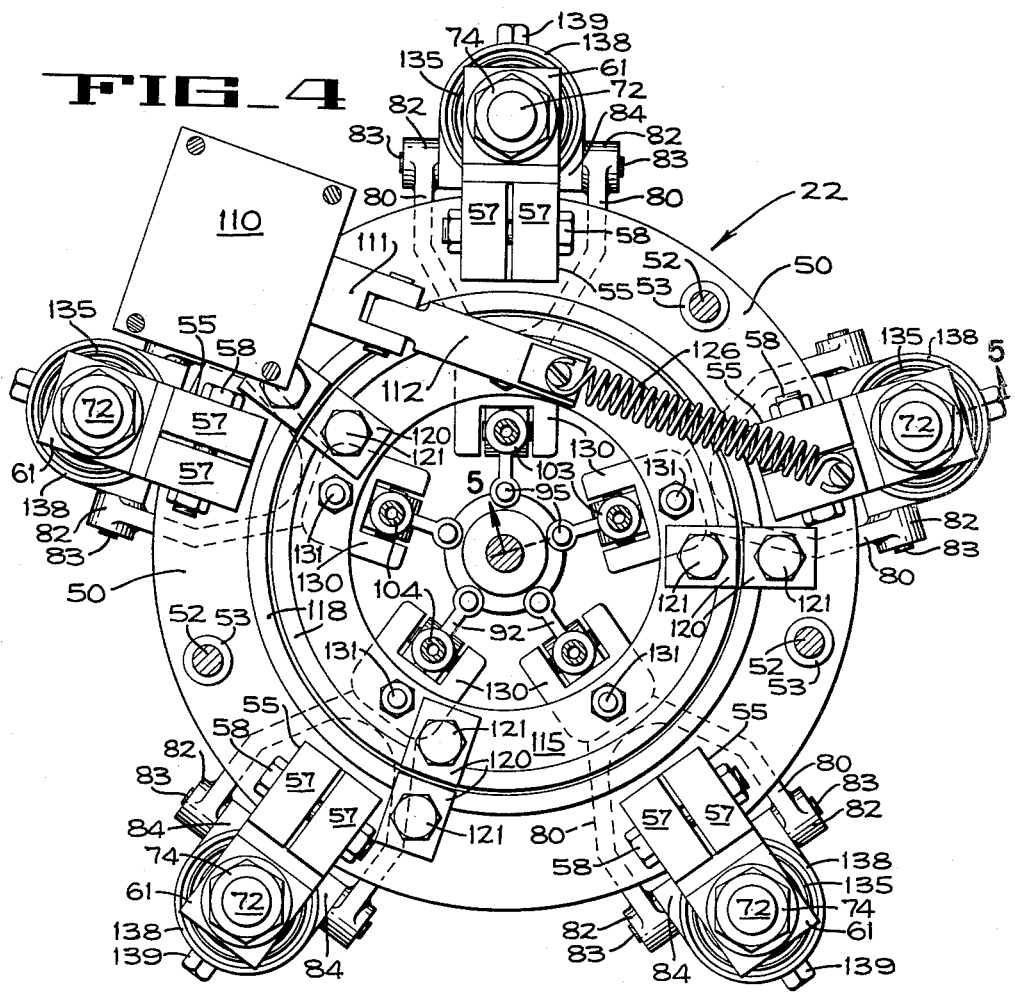
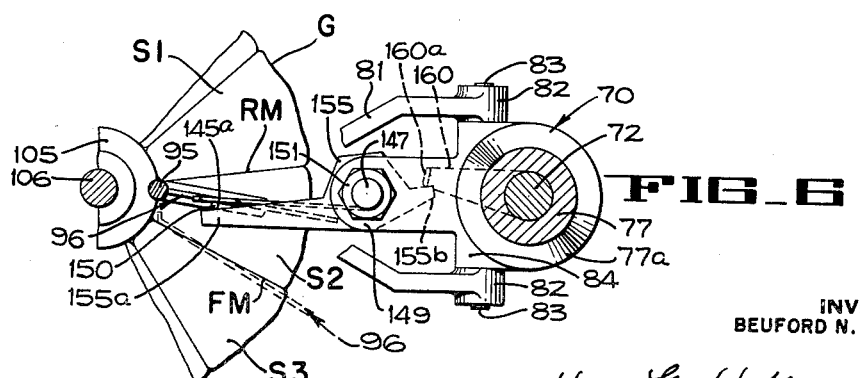
INVENTOR
BEUFORD N. WILLIS
BY *Hans G. Hoffmeister*
ATTORNEY Sept. 3, 1963  B. N. WILLIS  3,102,566
BLADE CONTROL MECHANISM FOR CITRUS FRUIT SECTIONIZING MACHINES
Filed Dec. 23, 1960  4 Sheets-Sheet 4
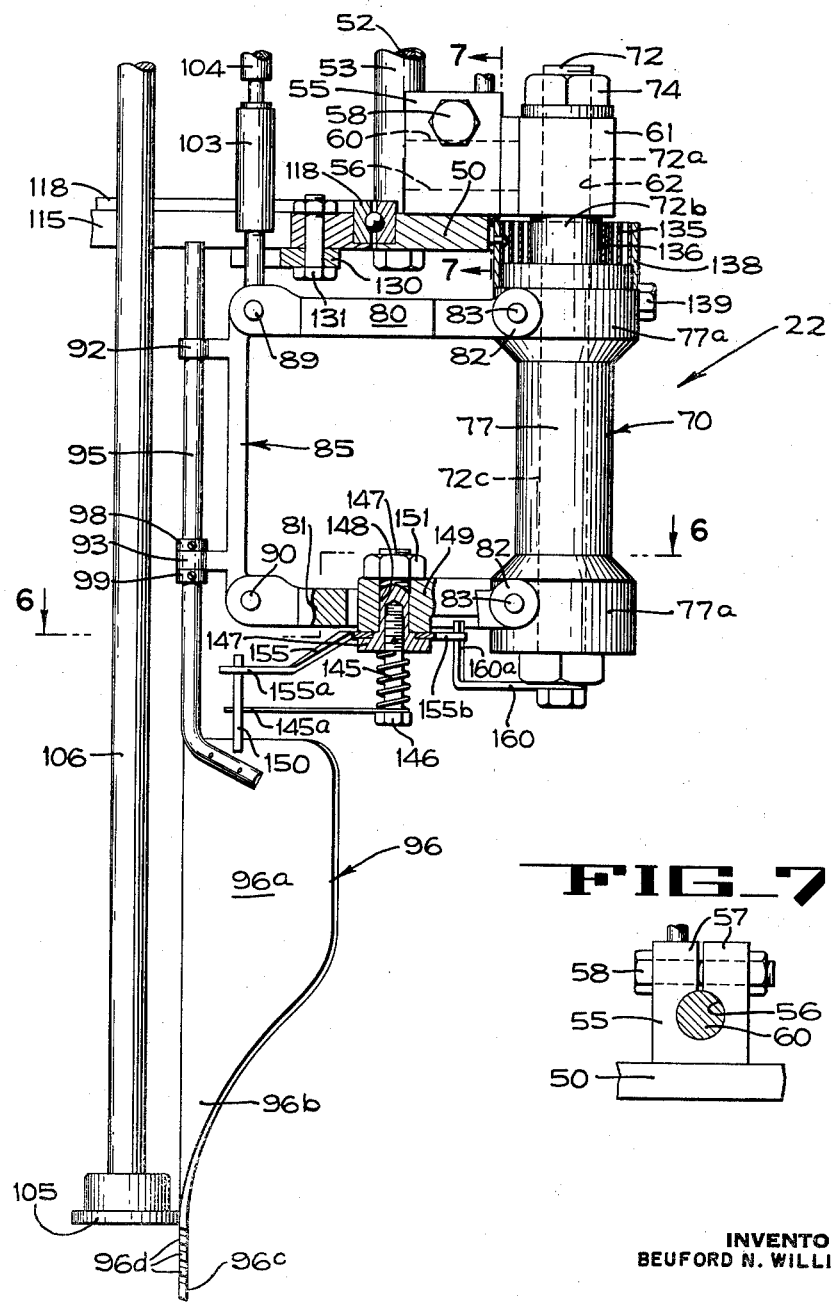
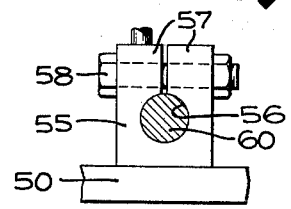
INVENTOR
BEUFORD N. WILLIS
BY *Hans G. Hoffmeister*
ATTORNEY

United States Patent Office 3,102,566
Patented Sept. 3, 1963

3,102,566
BLADE CONTROL MECHANISM FOR CITRUS
FRUIT SECTIONIZING MACHINES
Benford N. Willis, Lakeland, Fla., assignor to FMC Corporation, a corporation of Delaware
Filed Dec. 23, 1960, Ser. No. 78,073
5 Claims. (Cl. 146—3)

This invention pertains to citrus fruit sectionizing machines and, more particularly, to a mechanism for controlling the movement of the blades with which the meat segments of the fruit are separated from the enclosing radial membranes of the fruit.

The meat or juice-bearing portion of citrus fruit is composed of groups of interconnected juice sacs, each group being in the form of a segmental section which is surrounded by a membrane. The portions of the segment wall, which extend more or less radially from the core of the whole fruit and define the plane faces of the segment, are referred to as radial membranes, while the portion of the segment wall which lies adjacent the peel of the fruit and defines the spherical face of the segment is called the outer membrane.

In the citrus fruit industry, "sectionizing" is an operation by which the naturally-shaped, membrane-free meat segments are removed from the citrus fruit, particularly grapefruit, and this operation is generally performed by first peeling off the outer skin and albedo, subjecting the fruit to a hot lye treatment to remove the outer membrane from the segments, and stripping individually the segmental juice sac groups from their radical membranes. The stripping operation is usually carried out manually by inserting a blade between the meat segments and each radial membrane and then cutting the meat segment loose from the membrane. Such manual sectionizing is inefficient since the speed at which the operators must work makes it impossible for them to handle small, irregular meat segments or to carefully cut loose even the larger meat segments.

Machines previously proposed for sectionizing grapefruit have met with limited success due to the fact that the segments in grapefruit vary in number between 9 and 16 in the average fruit and usually are of unequal size and shape. In addition, the radial membranes seldom extend in true radial directions or in flat planes. These and other variable characteristics of citrus fruit make it difficult to use a sectionizing machine to obtain well-formed, membrane-free meat segments in their natural size without excessive rupturing of the juice sacs of the meat.

During a sectionizing operation by mechanical means, it has been found desirable to move the blades downwardly through the fruit, and to move the blades laterally into contact with an adjacent radial membrane. The complicated levers and linkages, which have been heretofore used to effect the necessary control of the blades, have been expensive to install and difficult to adjust and maintain. Accordingly, it is an object of the present invention to provide a simple accurate control mechanism for the blades of a citrus fruit sectionizing machine.

Another object is to provide an improved sectionizing head for a citrus fruit sectionizing machine.

Other and further objects and advantages of the present invention will become apparent from the following description taken in connection with the accompanying drawings, in which:

FIG. 1 is a more or less diagrammatic perspective of a grapefruit sectionizing machine embodying the blade control mechanism of the present invention.

FIG. 2 is a fragmentary enlarged vertical section, with parts broken away, taken substantially centrally through one of the sectionizing heads of the machine of FIG. 1, showing a portion of the blade vibrating mechanism also.

FIG. 3 is an enlarged horizontal section taken along the line 3—3 of FIG. 2.

FIG. 4 is an enlarged horizontal section taken along line 4—4 of FIG. 2.

FIG. 5 is a vertical section, with parts broken away, taken substantially along line 5—5 of FIG. 4.

FIG. 6 is a diagrammatic horizontal section taken along line 6—6 of FIG. 5.

FIG. 7 is a vertical section taken along line 7—7 of FIG. 5.

The grapefruit sectionizing machine 10 (FIG. 1), which was chosen to illustrate the apparatus of the present invention, is of the type disclosed in the application of Wilber C. Belk Serial No. 823,107 filed June 26, 1959, and of the type disclosed in the application of H. W. Grotewold, Serial No. 730,335 filed April 23, 1958, now Patent No. 3,072,160, both of these applications being assigned to the assignee of the present invention.

In general, the machine comprises a supply conveyor A on which whole, peeled grapefruit are delivered to a position near a rotary feed turret B. An operator removes each grapefruit from conveyor A and places it on turret B with the axis of the grapefruit extending in a generally vertical direction. The feed turret B is rotated in synchronism with a main turret C and with a transfer turret D which not only rotates but is capable of reciprocating vertically. When a grapefruit on feed turret B becomes aligned under a prong unit 12 on the transfer turret D, the turret D is moved downward to impale the grapefruit, and then is raised to remove the grapefruit from the feed turret. After a predetermined number of angular movements of the transfer turret D, the grapefruit is brought to a position directly above a carrier 14 on the main turret C so that the grapefruit may be transferred to the carrier incident to the next downward movement of the transfer turret.

The main turret C is mounted for intermittent movement through 45° angular increments about the axis of a vertical shaft 16 in a clockwise direction (FIG. 1) to move each grapefruit received in a carrier 14 into a cooperative association with a seed disturber unit 20, and then successively into position below four substantially identical sectionizing heads 22 (only the third and fourth heads being shown in FIG. 1). The sectionizing heads are carried by a vertically movable tool carrier P. Each head has a plurality of blades, which will be described presently, that are arranged to be vibrated in a vertical direction as they are moved downwardly into a grapefruit to separate the pie-shaped meat segments from the membranes enclosing them. The sectionized grapefruit, with the separated segments disposed around the core, is then brought under a spinner or stripper unit 25 that wraps the radial membranes around the stationary core, causing any remaining bond between the membranes and the segments to be completely broken and causing the segments to drop onto a discharge conveyor 28. The core is then moved to a position under a stripping mechanism 30 which removes the core from the fruit carrier.

The mechanisms of the machine, including the supply conveyor A, the feed turret B, the transfer turret D, the main turret C, the discharge conveyor 28, and other associated mechanisms, as well as the drive mechanisms for the conveyors and turrets, are substantially identical to those disclosed in the above-mentioned Grotewold and Belk applications and reference may be had to said applications for a detailed description of the construction and operation of the apparatus not described in detail hereinafter.

The present invention is particularly concerned with an improved sectionizing head and mechanism for controlling the members of the head. As seen in FIGS. 2 and 4, each head comprises a rigid ring 50 that is supported under the tool carrier plate P by three bolts 52 which extend through spacer sleeves 53 to mount the ring in fixed position a predetermined distance below the plate P. Five equi-spaced clamping blocks 55 are welded to the upper surface of the ring, each block having a cylindrical opening 56 (FIG. 7) and two spaced clamp arms 57 through which a bolt 58 projects. The opening 56 is arranged to receive in clamped engagement a short rod 60 projecting from a support block 61 (FIG. 5) which has a vertical cylindrical opening 62. Each of the five clamping blocks 55 supports a blade control unit 70 which includes a shaft 72 that has a portion 72a held in fixed position in the vertical opening 62 between a nut 74 and an enlarged portion 72b of the shaft 72. A generally tubular pivot member 77 is journalled for rotation by bearings (not shown) on the lower portion 72c of the fixed shaft 72. An upper and a lower yoke 80 and 81, respectively, are pivotally mounted on the tubular pivot member 77, each yoke having spaced hubs 82 (FIG. 3) pivotally mounted on a shaft 83 that is disposed in a boss 84 formed on an enlarged end portion 77a of the pivot member. A blade holder 85 (FIG. 5), which is pivotally connected to yoke 80 at 89 and to yoke 81 at 90, has two apertured arms 92 and 93 which receive a rod 95 to which a sectionizing blade 96 is secured, as by rivets. The rod 95 is secured to the blade holder 85 for vertical movement therewith by means of two set collars 98 and 99 which are secured to rod 95 and are respectively positioned above and below the arm 93.

It is to be noted that the yokes 80 and 81 of the blade control unit 70 cooperate with the blade holder 85 and the pivot member 77 to form a parallelogram linkage whereby the support rod is able to maintain a generally vertical position as it is reciprocated in a vertical direction.

The sectionizing blade 96 has a flat body portion 96a which has a lower tapered end 96b which terminates in a toothed probe or cutter 96c. The probe 96c, which has a plurality of cutting teeth 96d formed thereon, is twisted out of the plane of the body portion 96a at an angle of approximately 56° relative thereto. During the sectionizing operation, the blade 96 is rapidly reciprocated in a vertical direction by means of an eccentric reciprocating mechanism 100 (FIG. 2) which is connected to each blade holder 85 by means of two universal joints 102 and 103 and a push rod 104. The configuration of the blade 96 and the construction and operation of the reciprocating mechanism 100 are described in detail in the above-mentioned Belk application. A hold down member 105 is mounted on the lower end of a rod 106 which has, at its upper end, a cylindrical weight 107 (FIG. 2) slidably journalled in a fixed tube 108. When the head is moved down to engage the fruit, the hold down member 105 rests on the upper surface of the fruit.

In FIG. 6 is shown a sectional view of a portion of a grapefruit G, said portion having three pie-shaped meat segments S1, S2 and S3. When a blade 96 of each of the sectionizing heads 22 is initially moved downwardly, the probe 96c penetrates a pie-shaped meat segment, as for example segment S2, near the apex of the segment. It is desirable that, after the probe penetrates a short distance into the meat segment, the cutter be moved toward either the forward membrane FM or the rearward radial membrane RM to "find" or contact the membrane so that the blade will be close against the membrane as it is subsequently moved downwardly. Accordingly, before the probe enters the grapefruit, the entire blade control unit 70 is pivoted about the shaft 72 to move the blade away from the membrane which it will subsequently seek out. Since both membranes of each meat segment must be separated from the meat segment, two of the four sectionizing heads are arranged so that their blades seek out the forward membranes while the other two heads are arranged so that their blades seek out the rear membranes. One of the heads which seeks out a front membrane FM will be described, it being understood that the other heads are identical. Therefore, in the operation to be described, the blade control unit will first be pivoted clockwise (FIG. 6) to move the blade to a cocked position spaced from the plane of the front membrane FM.

The preliminary cocking movement of each head is effected by means of a solenoid 110 (FIGS. 2 and 4) that is bolted to the undersurface of the plate P and has a plunger 111 connected to a link 112 that overlies an actuator ring 115.

The ring 115 is disposed inside the stationary ring 50, with an annular bearing assembly 118 (FIG. 2) disposed between the rings. The bearing assembly 118 is held in place by short hold down plates 120 (FIG. 4) which are secured to the rings 50 and 115 by capscrews 121. The solenoid link 112 carries a depending arm 123 (FIG. 2) that is secured to the inner ring, as by a capscrew 124. When the solenoid 110 is energized, the link 112 is pulled to the left (FIG. 4) against the resistance of a coil spring 126 that is connected between the link 112 and one of the fixed blocks 55. Movement of the link to the left causes the actuator ring 115 to be rotated a short angular distance in a counterclockwise direction. Counterclockwise movement of the ring is transmitted to the blade control units by five spaced U-shaped members 130 that are secured to the undersurface of the ring 115 by capscrews 131 (FIG. 4). The legs of each U-shaped member straddle the upper end of the blade holder 85 and, accordingly, when the ring 115 is rotated, all the blade holders will be contacted and the blade control units will be swung clockwise about the fixed shafts 72, bringing each blade 96 to the position shown in full lines in FIG. 6.

When the head is subsequently moved downwardly and the probe has penetrated the grapefruit about one-half inch, the downward movement is stopped, and the solenoids 110 are de-energized, permitting each blade control unit to be swung counterclockwise about shaft 72 by a torsion spring 135 (FIGS. 3 and 5) which has one end secured to the shaft 72 by a capscrew 136 and the other end secured to a rigid ring 138. The ring 138 is fixed on the upper end of the pivot tube 77, as by a capscrew 139 so that, when the blade control unit 70 is swung clockwise by the solenoid-actuated ring 115, the torsion spring will be wound up or stressed. Then when the solenoid is de-energized and the blade control unit is released, the torsion spring resiliently moves the control unit counterclockwise causing the probe of the blade to be resiliently urged toward the adjacent membrane to assume the position shown in dotted lines in FIG. 6.

The spring 126 connected to the solenoid link 112 will rotate the ring 115 clockwise to bring the U-shaped actuator members 130 to their initial position. It will be understood that, when each U-shaped member is in its initial position, the legs of the member are spaced from the blade holder 85 so that the U-shaped members do not interfere with the movement of the resiliently urged, membrane-seeking probe.

It will be noted in FIG. 6 that, when the blade 96 reaches its dotted line operating position, the probe is engaged with the membrane but the body of the blade overlies the membrane. This overlying position of the blade is brought about by a torsion spring 145 (FIG. 5) that is anchored at one end in a capscrew 146 that is threaded into a support member 147. The member 147 extends upwardly through an opening 148 in an arm 149 projecting from the boss 84 that is formed on the lower enlarged end portion 77a of the pivot member 77. A nut 151 clamps the support member on arm 149. The spring 145 has an end portion 145a disposed in contact with a pin 150 that is fixed to and projects upwardly from the blade 96. The spring urges the pin against a pivotal stop lever 155 that is pivoted on a reduced diameter portion of the support member 147 (FIG. 5) and is disposed between the enlarged head of member 147 and arm 149.

As seen in FIG. 6, the stop lever 155 has an end portion 155a against which the torsion spring 145 holds the pin 150 of the blade. Thus the position of the blade relative to a radial line passing through the axis of the grapefruit is controlled by the spring 145 and the stop lever 155. An adjustable stop arm 160 is secured to the lower end of the fixed shaft 72 and has an upturned end portion 160a disposed alongside an end 155b of the stop lever 155.

It will be noted in FIG. 6 that, in each position to which the blade 96 is urged by the swinging movement of the blade control unit 70, the blade 96 is disposed almost in a radial plane of the grapefruit. Therefore, if the initial downward movement of the head causes the blade 96 to penetrate the grapefruit adjacent a membrane so that no laterally shifting of the head is necessary, the blade is ready for this downward movement since it is disposed almost radially of the grapefruit but slightly overlying the membrane.

The substantially radial position of the blade 96 is obtained automatically due to the fact that, as the control unit 70 is swung counterclockwise (FIG. 6) the end 155b of lever 155 tends to move away from the fixed stop 160. However, the spring 145a, acting through pin 150, rotates lever 155 counterclockwise also. Thus the pin 150 is allowed to shift its position on lever 155 to maintain the blade in a generally radial plane.

In operation, when the tool carrier plate P is in its elevated position, the solenoid 110 is energized to rotate the inner ring 115 and pivot the blade 96 to the full line, cocked position of FIG. 6. In this position, the spring 145 is urging the blade 96 against the end 155a of the stop lever 155. The carrier plate P is then moved downwardly to cause the probe on the lower end of the blade 96 to penetrate into the grapefruit. When the probe has penetrated to a depth of about one-half or five-eights of an inch, the downward movement of the carrier plate is stopped and the solenoid 110 is deenergized, permitting the torsion spring 135 to swing the blade control unit about the fixed shaft 72 if necessary to the dotted line position of FIG. 6. In this position, the blade overlies the front radial membrane FM and the leading edge of the probe is in abutting contact with the face of the membrane. It is to be particularly noted that each probe moves laterally toward the adjacent membrane under the resilient urging of a spring and, accordingly, this lateral movement will stop when the relative tough membrane is contacted. Accordingly, each blade of each head moves independently of the other blades and adapts its movement to the distance it must travel to contact the membrane.

When all of the probes are in engagement with the associated membranes, the carrier plate P is again moved downwardly. During this downward movement the blades are independently vibrated in a vertical direction by the vibrating mechanism 100 to cause the blades to separate the meat segments from the radial membranes.

From the foregoing description it will be apparent that the present invention provides a simple, efficient mechanism for cocking a blade mechanism of a citrus fruit sectionizing machine. The use of an easily rotatable ring and a solenoid to effect this control operation makes possible a more accurate cocking operation, and one that can be more easily coordinated with the several control operations of the machine.

It will be understood that modifications and variations may be effected without departing from the scope of the present invention as defined by the claims appended hereto.

The invention having thus been described, what is claimed and desired to be protected by Letters Patent is:

1. A sectionizing head comprising a fixed support member, a plurality of shafts mounted in fixed depending position in said support member, a tubular pivot member rotatably mounted on each shaft, a blade support linkage mounted on each pivot member for pivoting movement in a horizontal plane therewith and for vertical pivoting movement relative thereto, a blade carried by each linkage, an actuating ring rotatable in said support member, means for rotating said ring, means carried by said ring and arranged to engage and pivot each linkage in said horizontal plane, and means for rapidly reciprocating said linkages to vibrate the associated blades in a vertical direction.

2. A sectionizing head comprising a fixed support, a plurality of fixed shafts depending from said support and arranged in a circular pattern, a tubular pivot member rotatably mounted on each shaft, a pair of spaced parallel support arms pivoted on each pivot member, a blade support pivotally connected to both of said spaced arms, a blade carried by each blade support, an actuating ring rotatable in said fixed support, means carried by said ring and arranged to engage each blade support to pivot said blade support and the attached arms about the associated fixed shaft, and means for rotating said ring through a predetermined angular distance to move said blade about the axis of said fixed shaft.

3. A sectionizing head comprising a rigid support member, a plurality of sectionizing blades pivotally mounted on said member for movement in a substantially horizontal direction and mounted on said member for reciprocating movement in a generally vertical direction, an actuating mechanism connected to each blade for pivoting said blade in said horizontal direction, electro-magnetic means connected to said actuating mechanism and arranged to activate said actuating mechanism when energized, and means for rapidly reciprocating said blades in said vertical direction.

4. A sectionizing head comprising a fixed support member, a plurality of shafts mounted in fixed depending position in said support member, a pivot member, rotatably mounted on each shaft, a blade support linkage mounted on each pivot member for pivoting movement in a horizontal plane therewith and for vertical movement relative thereto, a blade carried by each linkage, an actuating ring rotatable in said support member, means for rotating said ring, means carried by said ring and arranged to engage and pivot each linkage in said horizontal plane, and means for rapidly reciprocating said linkages to vibrate the associated blades in a vertical direction.

5. A sectionizing head comprising a fixed support, a plurality of fixed shafts depending from said support and arranged in a circular pattern, a tubular pivot member rotatably mounted on each shaft, a pair of spaced parallel support arms mounted on each pivot member, a blade support mounted on both of said spaced arms for vertical movement relative to said pivot member, a blade carried by each blade support, an actuating ring rotatable in said fixed support, means carried by said ring and arranged to engage each blade support to pivot said blade support and the attached arms about the associated fixed shaft, and means for rotating said ring through a predetermined angular distance to move said blade about the axis of said fixed shaft.

References Cited in the file of this patent

UNITED STATES PATENTS

| | | |
|---|---|---|
| 256,926 | Sprague | Apr. 25, 1882 |
| 722,874 | McIntyre | Mar. 17, 1903 |
| 1,828,649 | Douthitt | Oct. 20, 1931 |
| 2,141,346 | Cover | Dec. 27, 1938 |
| 2,560,128 | Polk et al. | July 10, 1951 |